July 19, 1966      H. LEDEEN ETAL      3,261,266
VALVE ACTUATOR
Original Filed Nov. 7, 1960      4 Sheets-Sheet 1
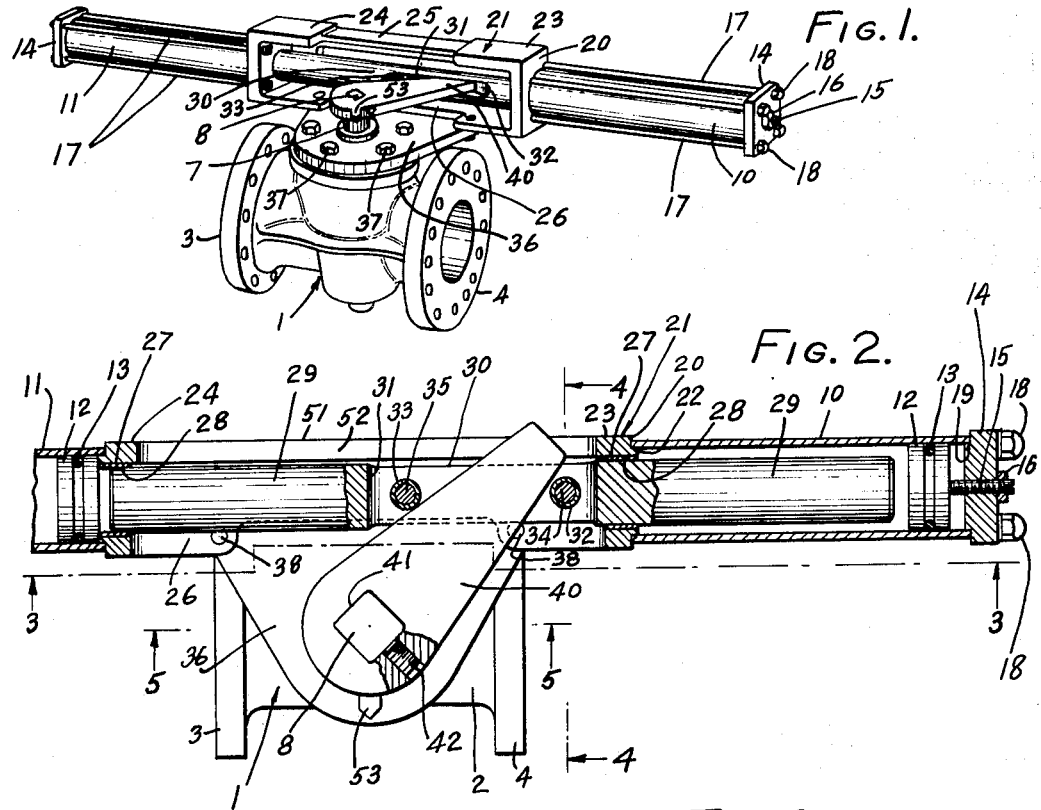
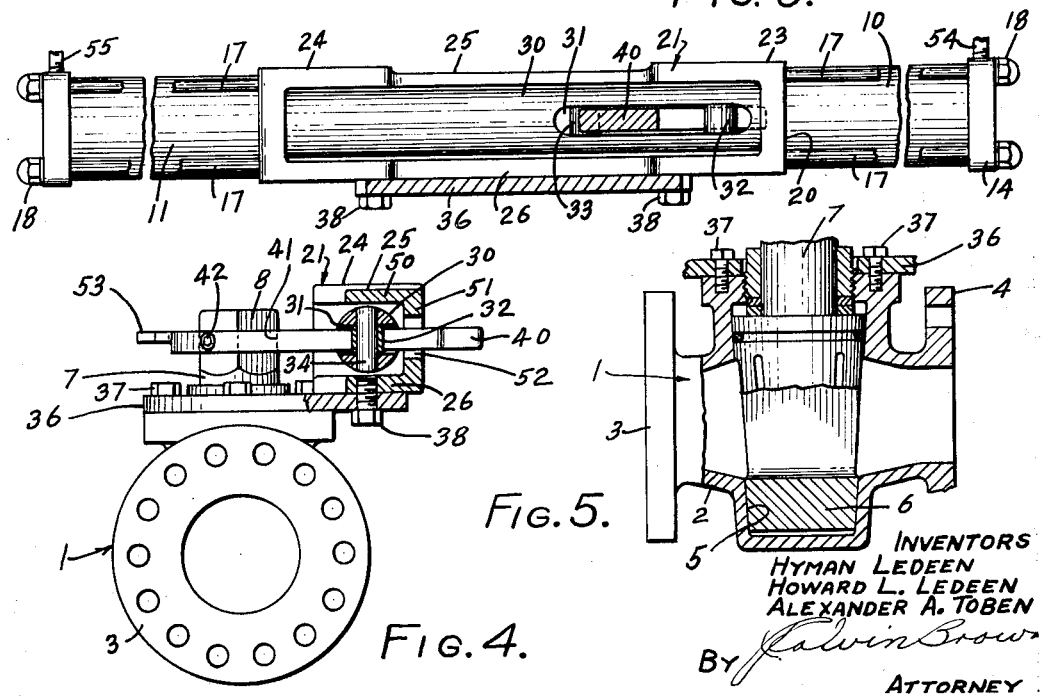
INVENTORS
HYMAN LEDEEN
HOWARD L. LEDEEN
ALEXANDER A. TOBEN
BY Calvin Brown
ATTORNEY July 19, 1966 H. LEDEEN ETAL 3,261,266
VALVE ACTUATOR
Original Filed Nov. 7, 1960 4 Sheets-Sheet 2
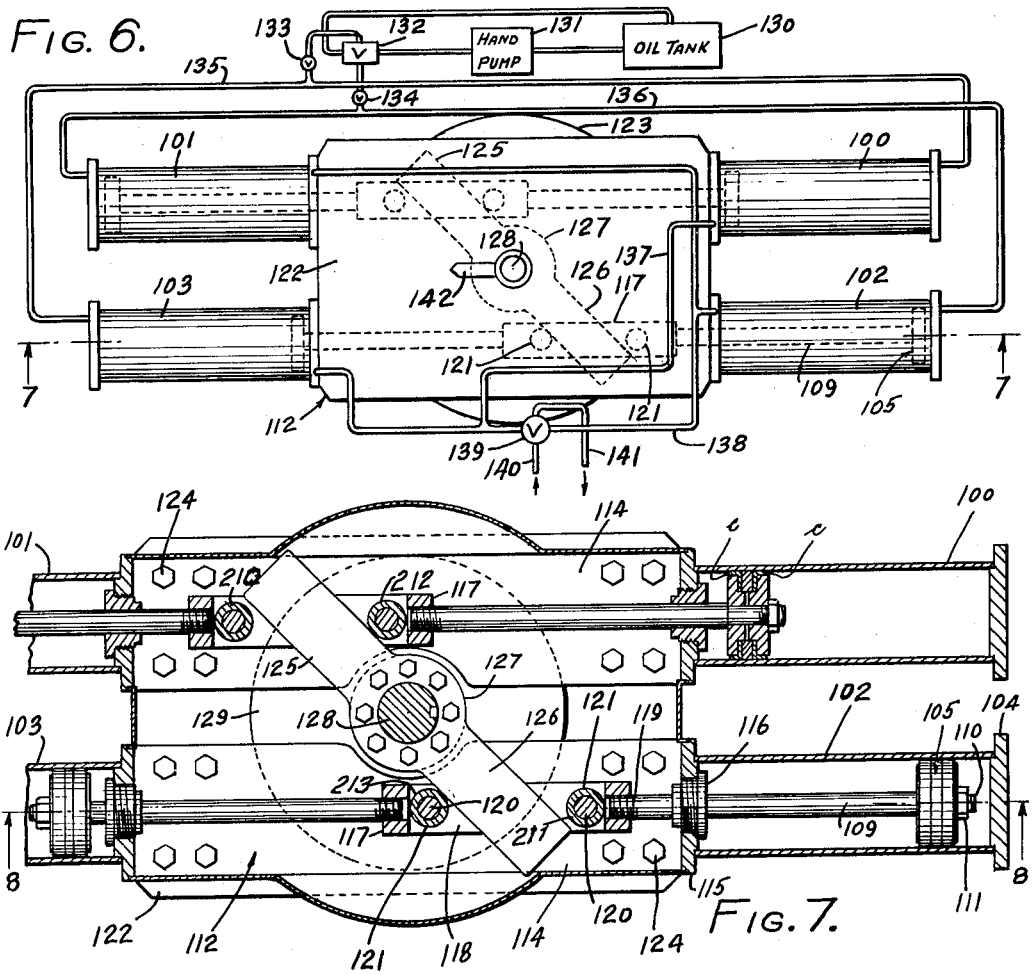
FIG. 6.
FIG. 7.
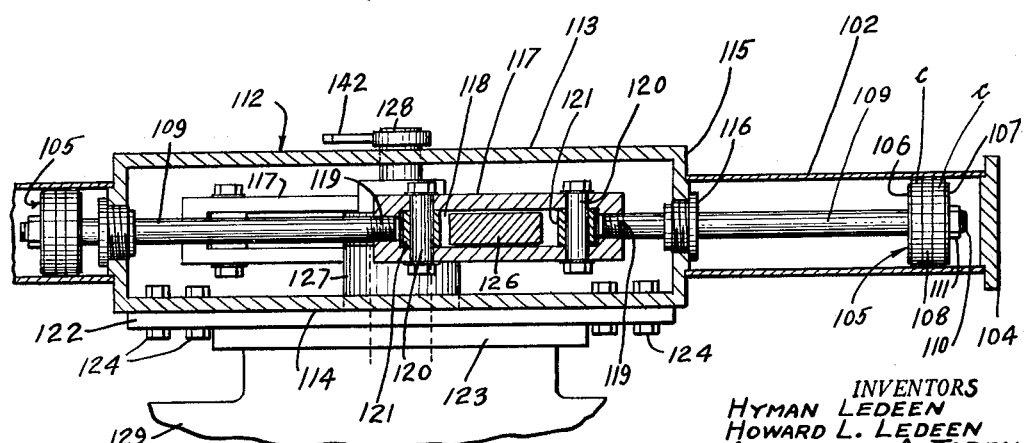
FIG. 8.
INVENTORS
HYMAN LEDEEN
HOWARD L. LEDEEN
ALEXANDER A. TOBEN
BY Calvin Brown
ATTORNEY July 19, 1966        H. LEDEEN ETAL        3,261,266
VALVE ACTUATOR Original Filed Nov. 7, 1960                4 Sheets-Sheet 3

INVENTORS
HYMAN LEDEEN
HOWARD L. LEDEEN
ALEXANDER A. TOBEN
BY *Calvin Brown*
           ATTORNEY July 19, 1966   H. LEDEEN ETAL   3,261,266
VALVE ACTUATOR
Original Filed Nov. 7, 1960   4 Sheets-Sheet 4
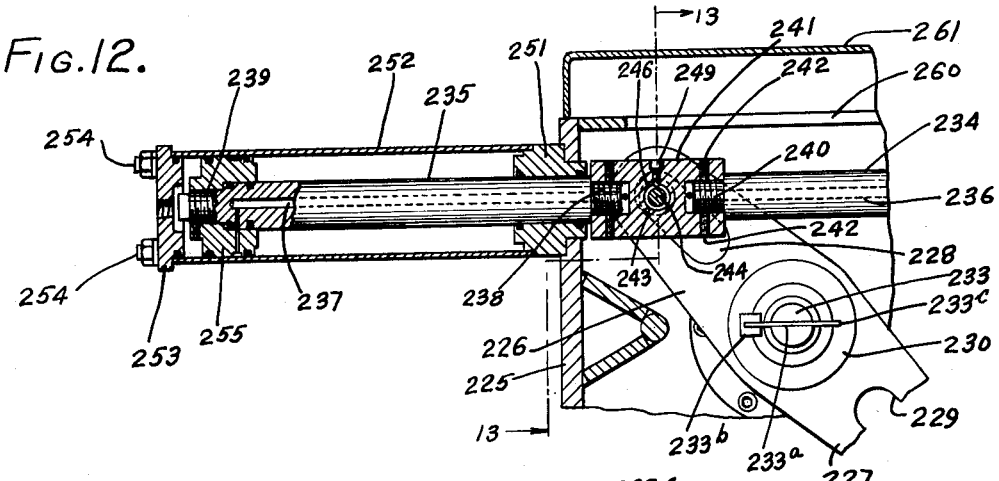
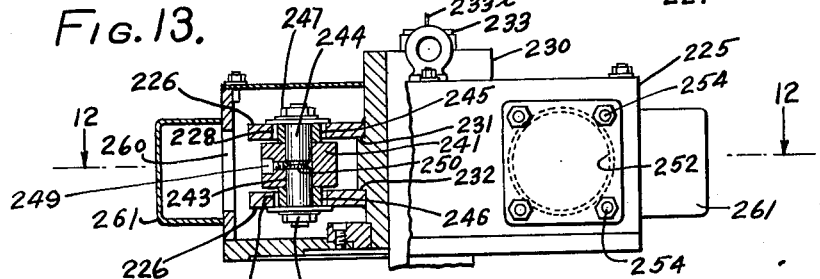
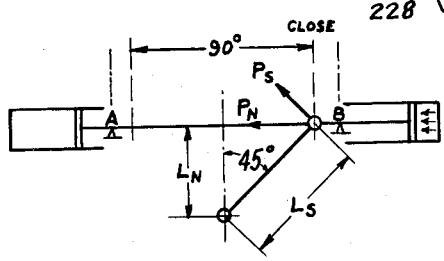
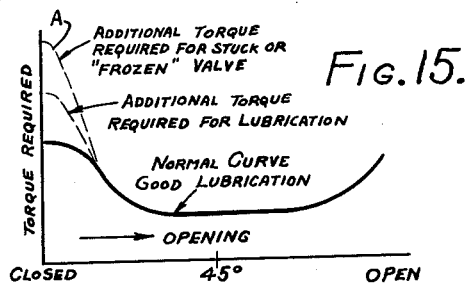
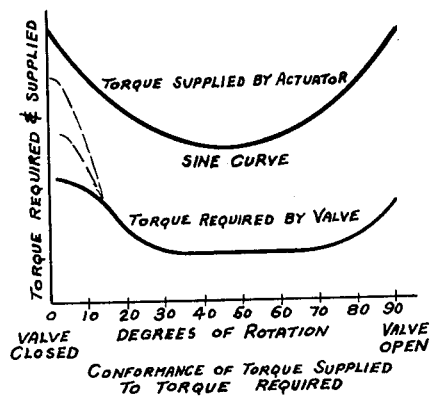
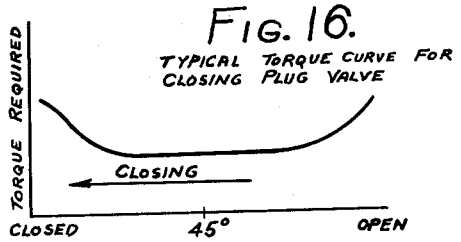
INVENTORS
HYMAN LEDEEN
HOWARD L. LEDEEN
ALEXANDER A. TOBEN
BY Calvin Brown
ATTORNEY United States Patent Office 3,261,266
Patented July 19, 1966

3,261,266
VALVE ACTUATOR
Hyman Ledeen, Pasadena, Howard L. Ledeen, La Canada, and Alexander A. Toben, Van Nuys, Calif., assignors to Ledeen, Inc., El Monte, Calif., a corporation of California
Continuation of application Ser. No. 67,798, Nov. 7, 1960. This application Dec. 31, 1963, Ser. No. 337,703
1 Claim. (Cl. 92—138)

This application is a continuation of application Serial No. 67,798, filed November 7, 1960, but now abandoned.

The present invention relates to valve actuators. An object of the invention is the provision of an actuator which may be directly attached to a valve body thereby eliminating any necessity for attaching a part of the actuator to an adjacent structure, such as a pipe.

A further object is the provision of an actuator adapted to turn a plug valve in such a manner that the actuator itself will stop turning motion of the plug so that the plug is not injured. With reference to this object, it is evident that when power means is utilized for the turning of a plug, excessive pressure in the power means may at times force the plug to a greater turning movement than required, resulting in injury to the valve. The present construction of our invention overcomes this difficulty. Certain actuators for plug type valves now on the market utilize an electric motor or a gas turbine actuating a train of gears mounted on the valve itself. It is evident that rotation of the motor must be reduced in speed but there is always a problem of a motor continuing to exert torque after the valve plug has moved to the end of its stroke, thus again putting an undue strain on both the plug and the valve housing. To prevent this, the electric type of actuator usually provides a limit type switch. The limit type switch shuts off the motor and the brake brings it to a complete stop at the time when the plug has supposedly reached the end of its rotation. We have found, however, that the brake does not always stop motor movement in time and the inertia of the motor is applied against the plug in the valve body causing serious damage such as leaks in the valve. This is true with the gas turbine type where difficulty has been caused as the gas turbine type is more difficult to stop than the electric motor unit. Therefore, a further object of our invention is an actuator for valves wherein inertia is not a problem and the stopping of movement in the valve itself or in the actuator is positive with the result that the valve body and valve plug are not damaged.

A further object is the provision of an actuator for moving a valve, such as a plug valve, wherein the actuator will not freeze and moves freely even under extreme temperature conditions, or where the actuator is used infrequently.

We have determined that the torque requirements for turning a valve such as a plug valve, vary as the plug valve is rotated and that the coefficient of friction differs from starting closing position of the plug valve to an open position thereof. The starting torque is usually quite high and the rotational torque is equally high from full closed position of the valve to its initial opening. The rotational torque from initial valve opening to full opening decreases rapidly and hence the torque is not uniform for various valve positions. We have determined that when an actuator is provided to produce rotation in a valve, the actuator must have sufficient torque capacity to take care of peak requirements. Therefore, an actuator which has a uniform torque output which provides enough torque to start, will also provide too much torque for the balance of movement of the valve. Hence, this excess of torque produces an acceleration, and the valve will open or close too rapidly, causing water hammer if the valve is used for the control of water flow, and consequent peak stresses in connected piping that sometimes leads to rupture. Throttling devices to control the flow of liquid through the actuator and consequently its speed of movement, are difficult to adjust and if set for a high torque condition, are inadequate for a low torque condition, and if correct for a low torque condition, offer too much resistance and the high torque may even prevent motion entirely. The present invention will move a valve in accordance with torque requirements.

Other objects will be appreciated by those skilled in the art to which this invention pertains.

In the drawings.

FIGURE 1 is a perspective view of one form of actuator for rotating a plug valve;

FIGURE 2 is a fragmentary, longitudinal sectional view of the actuator shown in FIGURE 1, and on an enlarged scale;

FIGURE 3 is a fragmentary sectional view on the line 3—3 of FIGURE 2;

FIGURE 4 is a sectional view on the line 4—4 of FIGURE 2;

FIGURE 5 is a fragmentary sectional view on the line 5—5 of FIGURE 2;

FIGURE 6 is a fragmentary plan view of a modified form of actuator from that of FIGURES 1 to 5 inclusive;

FIGURE 7 is a fragmentary sectional view on an enlarged scale of the type of actuator shown in FIGURE 6 and taken on the line 7—7 of FIGURE 6;

FIGURE 8 is a fragmentary sectional view taken on the line 8—8 of FIGURE 7;

FIGURE 12 is a fragmentary sectional view taken on the line 12—12 of FIGURE 13 of a modified form of actuator construction;

FIGURE 13 is a fragmentary sectional view taken on line 13—13 of FIGURE 12;

Figure 9:
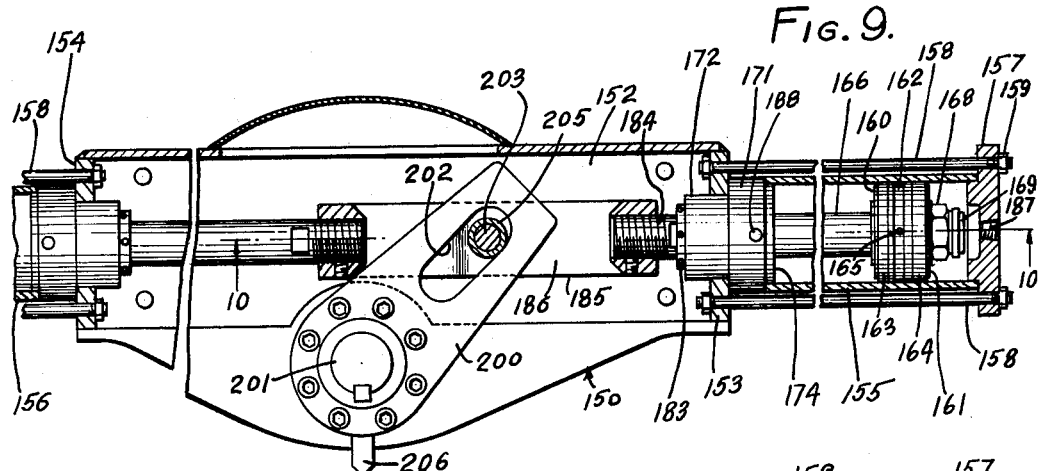
FIGURE 9 is a fragmentary longitudinal sectional view of a further modified form of actuator.

FIGURE 14 graphically illustrates torque producing elements and the mathematical relationship therebetween; and, FIGURES 15 to 17 inclusive, are graphs illustrating certain operating characteristics of our invention.

Referring now to the drawings, and specifically to that form of the invention illustrated in FIGURES 1 to 5 inclusive, we have illustrated an actuator for operating a plug type valve 1. No particular type of plug valve is intended and FIGURE 5 merely illustrates a plug valve type found on the market. The valve casing or housing 2 is provided with the usual end flanges 3 and 4 adapted to be bolted or otherwise secured to cooperative flanges of connecting pipe. As is customary, the valve body is formed with a frusto-conical valve seat 5 which houses the plug type valve 6. The plug type valve is provided with a valve stem 7 which, in the present instance, has a keyed round or a squared end portion 8, FIGURE 2, so that the valve may be rotated by any suitable means and in the present intsance by an actuator arm or torque lever to be described.

The actuator shown in FIGURES 1, 2 and 3, is of the dual or tandem type, which is to say, there are two axially aligned tubes or cylinders 10 and 11 of identical construction, and each tube houses a floating piston 12. As the two tubes and associated elements are the same, the tube 10 will be described, it being understood that the same elements are provided in the tube or cylinder 11.

Floating piston 12 is provided with an O-ring 13 on its periphery which performs the usual function of providing a seal between the piston and the inner surface of the tube or cylinder. The tube or cylinder is provided at one end with a head 14 formed with an axial screw threaded bore for receiving an adjustment screw 15 whereby the movement of the piston 12 towards said head may be regulated as shown in FIGURE 2, the adjustment screw being locked by a jamb nut 16. The head is secured to the tube 10 by means of tie rods designated generally as 17, the tie rods being equidistantly spaced apart and being passed through holes in the head, the tie rods being screw threaded at the outer ends thereof to receive cap nuts 18. It will be observed, upon reference to FIGURE 2, that the head has a reduced diameter portion 19 which enters an end of the tube or cylinder 10. The opposite end of the tube or cylinder 10, bears against one end 20 of a central frame 21. The end 20 has an annular flange 22 entering the tube or cylinder 10, as shown, and the tie rods 17 are secured to end 20 in any appropriate manner. Thus the tube or cylinder 10 may be readily dismantled by removing the cap nuts 18 from the tie rods to release the cylinder from end 20 of the frame 21. The frame 21 has a pair of spaced apart and aligned U-shaped ends 23 and 24 in facing relationship and which are interconnected by top and bottom ties 25 and 26. The ties are of less width than the width of the U-shaped ends. The U-shaped ends are transversely bored at 27 and provided with bushings 28. An elongated floating bar 29 extends between the tubes or cylinders 10 and 11 and is slidable in bushings 28. This bar is cylindrical in form and the intermediate portion 30 is provided with an elongated diametric slot 31. Positioned within the slot 31 are a pair of spaced apart rollers 32 and 33 mounted upon roller pins 34 and 35 which transversely bridge the slot 31 and are secured to the portion 30.

A bracket 36 is secured by means of bolts or equivalent means 37 to the top of the body of the plug valve, as shown in FIGURES 1 and 5 and supports the actuator in the manner shown in FIGURES 2 and 3 wherein the bracket is joined to the center frame 21 by means of bolts 38.

A torque arm 40 having a squared opening 41, is adapted to be mounted on the square valve stem 8 and is secured to said stem, in any appropriate manner, such as by a set screw 42, see FIGURE 2. The torque arm is adapted to project through the elongated slot 31 of the floating bar 29 and to be positioned between the rollers 32 and 33. In the present instance, the torque arm 40 has a reduced variable width from the hub outwardly and the rollers 32 and 33 are adjacent the opposite sides of the arm.

We have not detailed the center frame 21 other than to state that it is open. However, in FIGURE 2 as well as in FIGURE 4, it will be observed that the ties 25 and 26 are not transversely centered with relation to the U-shaped members 23 and 24 and that said ties have a top portion 50 and a right angle flange portion 51, the flanges being in opposed relationship for the top and bottom ties to provide a slot at 52 through which slot the torque lever 40 is passed, as shown. Such a construction aids in stiffening the frame.

In FIGURE 2, the floating bar 29 is assumed to have moved the right hand piston 12 to the limit of its excursion toward head 14 while the opposite end of the floating bar is in part confined within the bushing 28 and within the frame 21. This is the position assumed for the floating bar and torque lever when the plug valve is fully closed. The torque lever 40 is provided at its hub with an indicator arm 53 so that the actual position of rotation of the plug 6 within its housing or body, may be definitely ascertained.

Each head 14 is provided with a suitable duct leading to the interior of the tube or cylinders 10 and 11, whereby by means of suitable valved piping 54 and 55 (FIGURE 3) leading to a source of fluid under pressure, piston movement may be controlled in each tube or cylinder 10 and 11.

Reference is made to FIGURES 6 to 8 inclusive wherein we have illustrated what we term a quad-actuator, so designated as it has two aligned pairs of tandem type actuators. The quad actuator has a balanced torque in that it has a pair of diametrically arranged torque levers and a common hub. With each lever acted upon simultaneously by piston rods so that the torque on each lever is the same, the result is that the plug valve is free to turn without lateral thrust thereon. In the embodiment of our invention shown in FIGURES 6 to 8 inclusive, we provide two pairs of aligned tubes or cylinders as shown at 100, 101, and 102, 103. The tubes or cylinders 100 and 101 are in axial alignment as are likewise the cylinders 102 and 103. As the assembly for each cylinder is the same, only cylinder 102 will be described. This cylinder is provided with a head 104 which closes one end. The head 104 is quite similar in construction to the head 14, however, an adjustable limit stop for piston movement is not provided. A piston 105 is within the cylinder, the piston having followers 106 and 107, a spacer 108 therebetween, with a pair of piston cups c interposed between the two followers and the spacer. The piston cups tend to seal the piston within the tube or cylinder. The composite piston is mounted on a piston rod 109. Usually in a construction of the type under discussion, the piston rod is cylindrical and has a reduced screw threaded end 110 upon which portion the piston is mounted and held thereto by a nut 111 secured to the piston rod. The inner end of the tube or cylinder abuts one end of a frame 112. This frame includes top and bottom members 113 and 114, and an end 115 which is formed with a screw threaded bore to receive a gland nut 116 through which the piston rod 109 is passed. The opposite cylinder, piston and rod are of the same construction as just described for cylinder 102 and the axially aligned piston rods are connected by a coupling 117. In the present instance, the coupling 117 comprises an elongated body, substantially rectangular in form, and provided with an elongated slot 118. Thus the coupling has top, bottom and end members, the end members being formed with screw threaded bores for attachment to the screw threaded ends 119 of the piston rods 109. The coupling is transversely bored adjacent its ends to receive pins 120, which carry rollers 121. As shown in FIGURE 7, the cylinders 100 and 101 are secured to a frame identical in construction to the frame 112, and the cylinders, together with the pistons therein, are interconnected by a coupling like the coupling 117. The two framing members for the respective pairs of cylinders are adapted to be enclosed by means of a cover plate which bridges the two framing members, as shown in FIGURE 6 at 122, and likewise interconnected by a base member 123 secured to the bottom members of both framing members in any suitable manner such as by bolts 124. The base member 123 is mounted upon the top of the plug valve housing, a portion of which is shown at 129. A pair of diametrically arranged torque arms 125 and 126, provided with an intermediate hub 127, are mounted upon the plug valve stem 128. In each instance, a torque arm such as 125 and 126, is passed through the slot 118 of coupling 117, and is positioned between the pair of rollers 121 carried by the coupling.

In FIGURE 6, we have shown diagrammatically means for moving the pistons within their respective tubes or cylinders comprising an oil tank 130, a hand operated pump 131, and control valves 132, 133, and 134. The oil tank is in piped connection with the valve 132 and with the hand pump 131, the hand pump in turn being pipe connected to valve 132. Valve 132 communicates with valve 133, which in turn is connected to pipe line 135 while valves 132 and 134 interconnect, the valve 134 connecting with pipe line 136. Pipe line 135 connects with the heads of cylinders 100 and 103 while pipe line 136 connects with the heads of cylinders 101 and 102. The inner ends of the respective cylinders are connected by piping, as shown in FIGURE 6. Thus piping 137 connects the inner ends of cylinders 100 and 103 while piping 138 connects the inner ends of cylinders 101 and 102, there being a valve at 139 controlling communication between piping 137 and 138. Valve 139 is four way similar to 132. Gas pressure enters at 140 and goes to cylinders 101 and 102 or 100 and 103 as directed. Gas is exhausted from opposite cylinders through valve 139 at 141. To indicate the position of the plug in the plug valve housing, an indicator is provided for the valve stem at 142.

To add to the appearance of the actuator, the tops and sides of the frames are provided with cover plates, the side cover plates having arcuate portions of slightly greater radius than the radius of the torque arms. This maintains the mechanism dirt free.

The cylinders 100 to 103 inclusive are held by tie rods, not shown, in the same manner as shown in FIGURES 1 to 5 inclusive.

Figure 10:
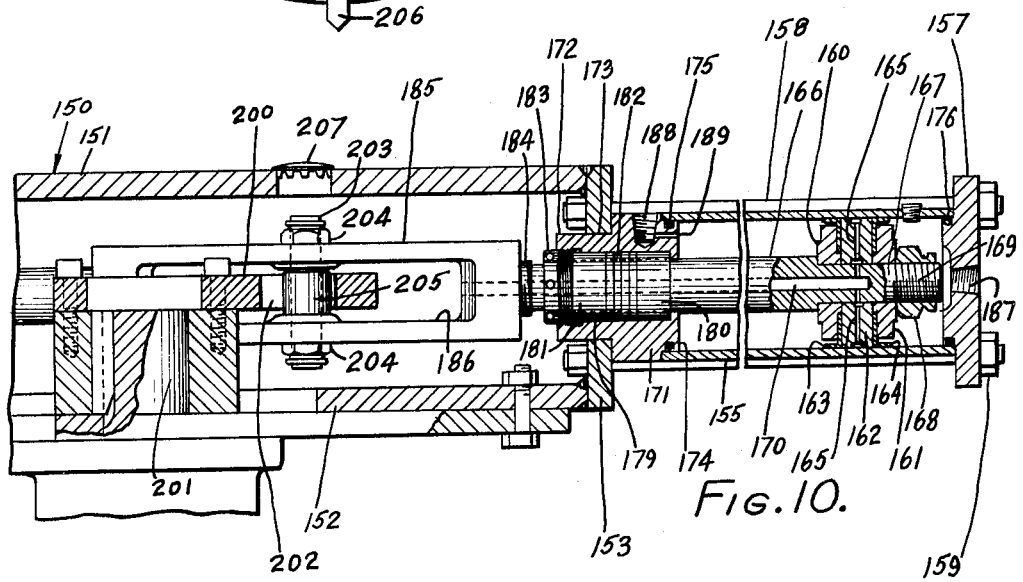
FIGURE 10 is a fragmentary sectional view on the line 10—10 of FIGURE 9, and on an enlarged scale.
Figure 11:
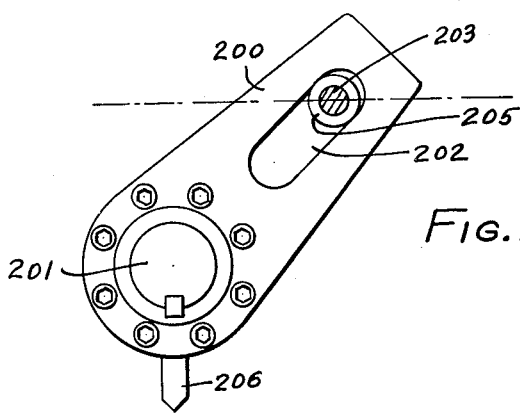
FIGURE 11 is a plan view of the torque arm for the actuator shown in FIGURES 9 and 10.

The form of the invention detailed in FIGURES 9 to 11 illustrates a different type of torque arm, as well as a "bleed-off" system which may be incorporated in the device of FIGURES 6 to 8 inclusive. We provide a frame 150 which has top, bottom and end members joined together, as shown at 151 to 154 inclusive, with tubes or cylinders projecting from end members 153 and 154, as shown at 155 and 156. The assembly for the tubes or cylinders including the pistons therein, are the same in each instance, and accordingly the assembly within the tube or cylinder 155 will be detailed. The head 157 is bored transversely to permit passage of tie rods 158 therethrough, of which there may be a multiple number, the tie rods likewise projecting through holes in the frame end 153, the tie rods being threaded for receiving lock nuts 159 to thereby hold the cylinder to end 153. The piston within the tube or cylinder 155 is of slightly different construction from those previously described and includes a pair of followers 160 and 161, a spacer 162 and a pair of piston cups 163 and 164 interposed between each follower and the spacer. This provides a seal between the piston and the cylinder or tube. The spacer 162 is provided with a series of radial holes 165 which function as ports. As shown, the spacer is an annulus and the holes extend from the periphery thereof to the inner bore. The piston assembly is mounted upon a piston arm 166, the piston arm having two portions of different diameter, the portion of lesser diameter 167 receives the piston which is held thereon by means of a lock nut 168 received on the threaded end 169 of the reduced diameter portion of the piston arm. The piston arm 166 is provided with an axial bore 170 which communicates with the radial bores 165 in the spacer 162. A rod head 171 has a reduced diameter portion 172 passed through a bore 173 in the frame end 153, and the tube or cylinder 155 is fitted upon a reduced diameter portion 174 of the rod head. Packing 175 is included between the cylinder and rod head. There is also packing at 176 between the cylinder and head 157. The rod head 171 is bored at 179 to receive gland bushings 180 and 181 and an intermediate packing 182 through which gland bushings and packing is passed the enlarged diameter portion of the piston rod 166. A packing gland 183 is screw threaded to the rod head, and particularly the portion 172. The piston rod has a threaded end 184 which is in threaded connection with coupling 185. This coupling is similar to the coupling 117, shown in FIGURE 8, in that it has spaced apart top and bottom members, thus providing a slot 186. As shown, the bore 170 in the piston arm, extends to the slot 186. In addition to the foregoing, the head 157 is provided with a threaded port at 187 and the rod head 171 has a port 188 and an intercommunicating port 189 leading to the interior of the tube or cylinder.

A torque arm 200 is adapted to be secured at its hub by keying or by other means to the stem 201 of a plug valve. The torque arm is provided with a radial slot 202 intermediate the sides of the arm. The coupling 185, intermediate its length, is provided with a screw threaded pin 203 passed through aligned transverse bores in the top and bottom members of the coupling and locked to the coupling in any appropriate manner such as by lock nuts 204. The pin carries a roller 205, which roller is located within the confines of the slot 186. The roller is positioned within the radial slot 202, of the torque arm 200. The bottom member of the frame 150 may be secured to the plug valve housing in a manner similar to the construction shown in FIGURES 6, 7 and 8, and suitable plates may be provided for enclosing the framing. As before, a pointer arm 206 is secured to the hub of the torque arm. If the frame is entirely enclosed, a breather cap 207 is provided so that the interior of the frame may be open to the atmosphere.

In FIGURES 12 and 13 we have illustrated a modified form of our actuator construction with cylinders and pistons therein which may follow the construction of FIGURE 10, although the present embodiment contemplates four tubes or cylinders. The construction is such that the size of the same may be reduced, particularly as concerns the casing 225 adapted to enclose the torque arms. The torque arms, in this instance, comprise two equal size arms 226 and 227 of identical construction which overlie each other in parallel relationship. Both arms are slotted radially inwardly from each end, as indicated at 228 and 229 for one end of each arm. Both arms are welded or otherwise secured intermediately thereof to a hub 230, the hub being annularly shouldered at 231 and 232 so that the arms at the central portions may rest upon the shoulders and be welded thereto. This gives a very strong construction and one that has been found to operate in an efficient manner. The valve stem 233 which is round sectioned, extends within the hub and is transversely slotted, as indicated at 233a. The top of the hub has a stud 233b carrying a key or arm 233c adapted to diametrically span the top of the hub and be received in the slot 233a of the valve stem 231. This secures the hub to the stem for rotation.

The piston rods 234 and 235 are in axial alignment and follow the construction of FIGURE 10 in that in each instance they are provided with axial internal bores 236 and 237 which provide an escape for oil or gas as has been described for FIGURE 10. Each piston rod 234 and 235 is reduced in diameter at each end and screw threaded, as indicated at 238 and 239 for arm 235, and 240 for arm 234. The inner ends of the piston rods are screw threaded to a coupling 241 with set screws, indicated generally at 242, passed through the coupling and engaging the threaded ends 238 and 240 to prevent unscrewing. The coupling 241 is transversely bored at 243 to receive a pin 244 which extends through the coupling and carries rollers 245 and 246. The pin 244 is held between the pair of torque arms by suitable means 247. In addition we provide a set screw or set screws 249 passed through the coupling and engaging an annular groove 250 in the pin. It will be noted in the embodiment shown in FIGURE 13 that the rollers 245 and 246 are positioned within the slots 228 of the upper and lower torque arms. The opposite ends of the torque arms are similarly constructed and arranged for engagement with the piston rods for each cylinder.

The piston rod 235, which is representative of all of the piston rods, is passed through a rod head 251, the rod head being secured to the casing 225. Also secured to the rod head is a tube or cylinder 252 the outer end of which carries a blank head 253, the blank head being secured to the casing 225 by tie rods 254 of which there may be a multiple number, the arrangement being essentially the same as shown in FIGURES 1 and 3. Each piston rod carries a piston 255 for movement in its respective cylinder or tube, the piston being locked to the piston rod in any appropriate manner such as by a washer and nut combination secured on the threaded outer end of the piston rod.

The casing 225 is square in outline with the side walls, which do not carry the cylinders, slotted as indicated at 260 to allow the ends of the torque arms to pass therethrough during turning movement thereof. This portion of the casing carries torque arm guards 261 which are essentially small closed end channel type casings secured to the main casing in any appropriate manner, such as by welding, or bolting.

The operation, uses and advantages of the constructions shown and described, are as follows:

The function of our plug valve actuator is to produce "torque" or "turning effort." In the case of a plug valve, the resistance to turning or "torque" is not uniform, but varies through the ninety degrees of opening and closing rotation. An examination of FIGURES 15 and 16 illustrates the pattern of this "torque" variation. FIGURE 15 illustrates characteristic "torque" versus degrees of opening for a typical plug valve. As the plug valve is rotated from the closed to open position, a sharp variation in torque is observed. The high initial torque results from the unbalanced force produced by the line pressure acting against the effective area of the valve throat.

In most tapered plug valve designs, the plug and body surfaces are separated by a film of lubricant. The load-carrying capacity of the lubricant, alignment of the plug, and auxiliary anti-friction bearings influence the degree of boundary lubrication available when the valve is to be opened. Sometimes boundary lubrication is poor and breakaway torque values can soar, as illustrated by curve "A," FIGURE 15. This condition is generally associated with metal to metal contact or corrosion between the plug valve and seat. Oftentimes it can be remedied by lubrication.

Movement of a plug valve from open to closed position presents a curve as shown in FIGURE 16. Additional torque is required to finally close the valve. This build-up is normal and results from the unbalanced force produced by pressure differential. It is this unbalanced force that thrusts the plug against its supporting surfaces and results in the torque buildup.

To summarize the torque characteristics of a plug valve, the following statements are made:

I. The plug valve is basically an unbalanced type valve. In other words, differential pressure across the plug produces frictional resistance to turning or torque. Like all frictional devices, resistance is a direct function of load.
II. Under conditions of maximum pressure differential across the plug, the so-called lubricated condition of the valve is questionable and for valve operator consideration, we must assume boundary type conditions.
III. Maximum torque in a plug valve is generally encountered when the valve is in the fully closed position, and holding against maximum differential.

With further reference to point "II" above, we state that the torque build up which results from the boundary type lubrication is influenced by:

a. Degree of lubrication.
b. Type of luricant used.
c. Differential pressure across the valve.
d. Duration of time that the plug valve has been in closed position holding against maximum differential.
e. Type of fluid flowing through the valve.

The foregoing discussion relates primarily to the torque characteristics of the plug valve. It is desirable to analyze the characteristics of torque generation, as produced by the plug valve actuator. Since the primary function of the actuator is to turn the valve, the torque generation of the actuator is important.

Most actuators produce a uniform torque output. The actuator must, therefore, be large enough to provide the very highest torque required by the valve, even if torque output is needed only for the first few degrees of rotation.

Our invention includes two cylinders in tandem, and because these cylinders produce thrust along a fixed axis and transmit thrust to a rotating lever through a loose roller connection the initial torque output is intensified at starting to about two times the normal torque output.

FIGURE 14 illustrates a free body diagram of the essential torque producing elements in our actuators. Tandem cylinders are represented as a bar restrained laterally at bearing points "A" and "B." Thrust on this bar is, of course, developed by the action of the cylinders. At the opening position, the lever arm has a length $L_s$, which is 1.42 times the arm $L_n$ in neutral or mid position. Force $P_s$ likewise acts at right angles to the lever and is equal to 1.42 times the normal pressure $P_n$. The total torques are, therefore, $P_n$ times $L_n$ at the mid-point position and $P_s$ times $L_s$ at the starting (and at final) position. But, $P_s$ times $L_s$ equals 1.42 $P_n$ times 1.42 $L_n$ and is, therefore, equal to 2 times $P_nL_n$ or:

$$T_s = 2 \ (P_nL_n)$$

The static mechanical analysis of the simple free body diagram is portrayed graphically in FIGURE 17. Here we have a torque development of two times the normal for breakaway at either the opening or closing extremity of action. The curve and the torque which it represents corresponds more closely to the torque required by the valve.

The significance of the above explanation is obvious. With the actuator, there is more torque available in the breakaway zone of rotation. This means that if a normal increase in torque results as a plug valve is holding against full differential pressure, the actuator, having two times its nominal torque in that zone, can still break the valve free from its static condition. After the valve has started rotation, the required torque falls off rapidly and the actuator torque output moves to nominal value at mid-position and then commences to increase again to two times normal. What is of greatest significance, however, is that the size of the actuator required for a given valve may be considerably reduced.

The information outlined above, although specifically referenced to the geometry of action of a tandem type actuator, also applies to the quad type unit (FIGS. 6, 7 and 8). The quad type unit is primarily designed for the larger plug valve where greater torques are required. The quad type unit provides a balanced torque delivery to the plug valve, thus preventing cocking or heavy side loading of the plug stem.

Referring to that form of the plug valve actuator shown in FIGURES 1 to 5 inclusive, we have purposely eliminated from the drawing, for the sake of clarity, piping and associated elements such as shown in FIGURES 6 to 8 for moving the pistons within the tubes or cylinders. It is, however, assumed that suitable piping connects with the heads for the tubes or cylinders shown so that when fluid under pressure is directed within tube or cylinder 10, the piston will be moved to the left of said showing while fluid within the tube or cylinder 11 flows back to the oil tank as the piston in tube 11 moves to the left. The construction shown is called a tandem type plug valve actuator and the pistons may be moved by hand pump or under power. One cylinder at a time has fluid under pressure admitted therein to move the piston and this type of actuator is used where the plug valve requires small torque to operate it. We have found that in the case of rigid connection between the pistons, that the O-rings carried by the pistons have a tendency to wear rapidly due to reaction against the piston arms interconnecting the two pistons due to angular position of the torque lever. In the construction shown in FIGURES 1 to 5 inclusive, there is no undue wear on the O-ring and the "O" rings will continue to operate for many cycles. The pistons are free floating and the bar 29 is likewise free floating and guided as to movement by the bushing type bearings 28. Any reaction against the floating bar by the angular position of the torque lever, is taken by the bushings 28 and is not taken by the free floating pistons.

It is to be observed that there is a space between the roller 32 and the edge of the torque lever, in the position shown in FIGURE 2 and that the roller 33 is engaging the opposite edge of the lever. If the lever is about to start a return movement, that is, a counter-clockwise movement, the radius arm between the axis of the stem of the plug valve to the axis of the pin 35 is less than the radius arm from the axis of the valve stem to the axis of pin 34. Thus when pressure fluid is admitted through head 14 against the piston 12, a greater torque is exerted due to radius arm difference. In other words, the starting torque is relatively high and as a consequence the actuator ordinarily has the capacity to take care of peak requirements. The effect, of course, diminishes as the torque lever rotates to, say, a central line position for the lever. FIGURES 1 and 2 show a position for the torque lever in which the valve is closed; a 90° movement from the position will fully open the valve. However, for any position of the lever, the torque applied thereby to the valve stem will be equal to the applied force times the torque arm, and it is evident that the arrangement shown shows a gradual decrease for the first 45° of movement of the torque arm in torque output, but that the torque output increases during the second half or second 45° movement of the arm. In other words, the torque output of the actuator follows closely the torque requirements of the valve.

Considering the form of our invention as shown in FIGURES 9 to 11 inclusive, it will be noted in FIGURE 9 that the slot 202 has a greater width than the roller diameter. Hence the piston must move a distance equal to the clearance between the slot and the roller before the lever 200 is actuated, thus overcoming static friction which is required for plug valve opening and closing. In FIGURE 11, the roller has substantially the same diameter as the slot width, and the lever responds instantly to the movement of the piston. Such movement is required when the actuator is used to rotate the plug valve back and forth for throttling or governing service, sometimes termed modulating service. The pressure to the piston is controlled by some form of governor or controller (not shown) that responds to the pressure or other condition in the main line, and increases or decreases the amount of valve plug opening, as required.

One of the difficulties often occurring in pressure actuators is leakage past the piston of oil or other fluid used for actuating the piston. In FIGURE 10 we have shown a construction which effectively overcomes this difficulty. Thus, the space included between the piston and the rod head 171 is adapted to receive oil which functions as a speed control fluid. The port 187 is in communication with a fluid, such as air, under pressure for moving the piston in one direction under control. A valved connection with the port 188 communicates with the cylinder 156. A setting of the valves will obviously control the discharge of fluid such as oil from between the piston and the rod head. This system permits different speeds and movements of the pistons, one speed for forward movement and one for reverse. If the pressure fluid is gas or air, the gas may leak past the piston and into the speed control fluid, which, in this instance, is assumed to be oil. Gas going into oil tends to make the oil ineffectual for speed control. As shown, if the pressure fluid leaks past the piston, it will be received within the radial ports 165 of the spacer and directed into the axial bore 170 and will exhaust to the atmosphere as this bore communicates with the slot 186 in the coupling.

The form of the invention shown in FIGURES 6 to 8 inclusive, effects a balanced torque on the stem of the plug valve due to the fact that the levers 125 and 126 are acted upon simultaneously. In this instance, the piston arms are fixed to the pistons, which is to say, are not floating. As shown in FIGURE 7, the pistons have made substantially a full excursion in their respective cylinders and return movement of the pistons is to be effected. The rollers 121 at 210 and 211 have a greater radial distance from the center of the plug stem than do the rollers 121 at 212 and 213. The sides of the levers 125 and 126, are parallel and the rollers move along the sides of the levers. Thus, when it is desired to open the valve or to close the valve, there is a high torque output and this output gradually diminishes as the valve plug is turned.

The form of the invention shown in FIGURES 12 and 13 is saving in space while performing satisfactorily and efficiently. The casing may be square and the pair of overlying torque arms 226, 227 which are of identical construction add great strength to the construction particularly where heavy pressures must be encountered and the valve is difficult to rotate from open to closed position or vice versa. The operation for this form of the invention is the same as previously described for other forms of actuators but structurally it provides a solid construction.

We claim:

An actuator for a plug valve having a housing and a valve plug, including: a variable width torque lever adapted to be connected to the valve plug; said torque lever being free of any joints or hinges; a pair of opposed axially aligned cylinders; a floating piston reciprocable in each cylinder; a floating bar axially extending between the cylinders and being free of but adapted to engage the floating pistons with its opposite ends; means to admit fluid pressure under the control of an operator to reciprocate the pistons and effect reciprocation of said floating bar; a pair of rollers carried by the floating bar; the variable width torque lever being positioned between said rollers; the rollers being spaced apart a distance greater than the width of the torque lever; the parts being so constructed and arranged that movement of a roller caused by said floating bar occurs prior to contact of the roller with the torque lever to overcome static friction, and the initial torque output is intensified to substantially two times the normal torque output.

References Cited by the Examiner

UNITED STATES PATENTS

| | | | |
|---|---|---|---|
| 45,756 | 1/1865 | Sexton | 91—323 |
| 934,147 | 9/1909 | Dubuque | 74—104 |
| 1,854,531 | 4/1932 | Tweit et al. | 251—58 |
| 1,923,681 | 8/1933 | McCabe | 251—138 X |
| 2,715,389 | 8/1955 | Johnson | 92—13 X |
| 2,737,157 | 3/1956 | Hefner et al. | 92—129 |
| 3,056,573 | 10/1962 | Matheson et al. | 251—31 |

M. CARY NELSON, *Primary Examiner.*

A. ROSENTHAL, *Assistant Examiner.*